United States Patent Office 3,472,220
Patented Oct. 14, 1969

3,472,220
TEMPERATURE CONTROL SYSTEMS USING A TIME DELAY RELAY
James R. Willson, Garden Grove, Calif., assignor to Robertshaw Controls Company, Richmond, Va., a corporation of Delaware
Filed Oct. 25, 1967, Ser. No. 678,028
Int. Cl. F24h 3/02; F23h 5/00
U.S. Cl. 126—110                    10 Claims

ABSTRACT OF THE DISCLOSURE

Temperature control systems including time delay relay circuitry for time sequence control of a circulation fan, an electric igniter and a fuel valve and for placing the systems in a lock-out condition when there is ignition failure or flame failure.

BACKGROUND OF THE INVENTION

The present invention relates to temperature control systems, such as heating and/or cooling systems, and more specifically to such systems wherein a time delay relay is utilized for control purposes.

It has been found that in order to maintain adequate temperature control in an area remote from the heating and/or cooling installation, the operation of a circulation fan can be suitably controlled by a time delay relay operable in response to an on-off temperature control located in the remote area. Many of these installations require electric ignition systems for dependable operation. In these systems, it is desirable to have an automatic ignition device responsive to the same on-off temperature control that initiates the starting and stopping of the circulation fan, and it is also desirable to have flame proving means to protect against flame failure by shutting off the temperature control system.

SUMMARY OF THE INVENTION

The present invention is generally characterized in that a time delay relay controls an electric igniter, a fuel valve and a circulation fan in a forced air temperature control system. The time delay relay operates in cooperation with one or more conventional relays to permit electric ignition only during the interium after a demand is received from an on-off temperature control and before the time delay relay is actuated. The time delay relay and the one or more conventional relays also control the operation of the fuel valve and the circulation fan in accordance with the temperature in the remote area, proper ignition, flame continuity and electrical continuity.

One of the advantages of the present invention is that when a hazardous condition is present, such as ignition failure or flame failure, the system assumes a lock-out condition. Another advantage is that momentary electrical or flame interruptions will not prevent continuous temperature control.

An object of the present invention is to automatically control the temperature in a remote area by the use of time delay relay circuitry in combination with conventional relays.

A further object of the present invention is to utilize time delay relay circuitry in a temperature control system to continuously operate the system notwithstanding momentary electrical or flame interruptions.

Another object of the present invention is to place a temperature control system in a lock-out condition when there is ignition failure or flame failure.

A further object of the present invention is to selectively control the operation of an electric igniter, a fuel valve and a circulating fan in a temperature control system by the use of time delay relay circuitry in combination with conventional relay circuitry.

Figure 1:
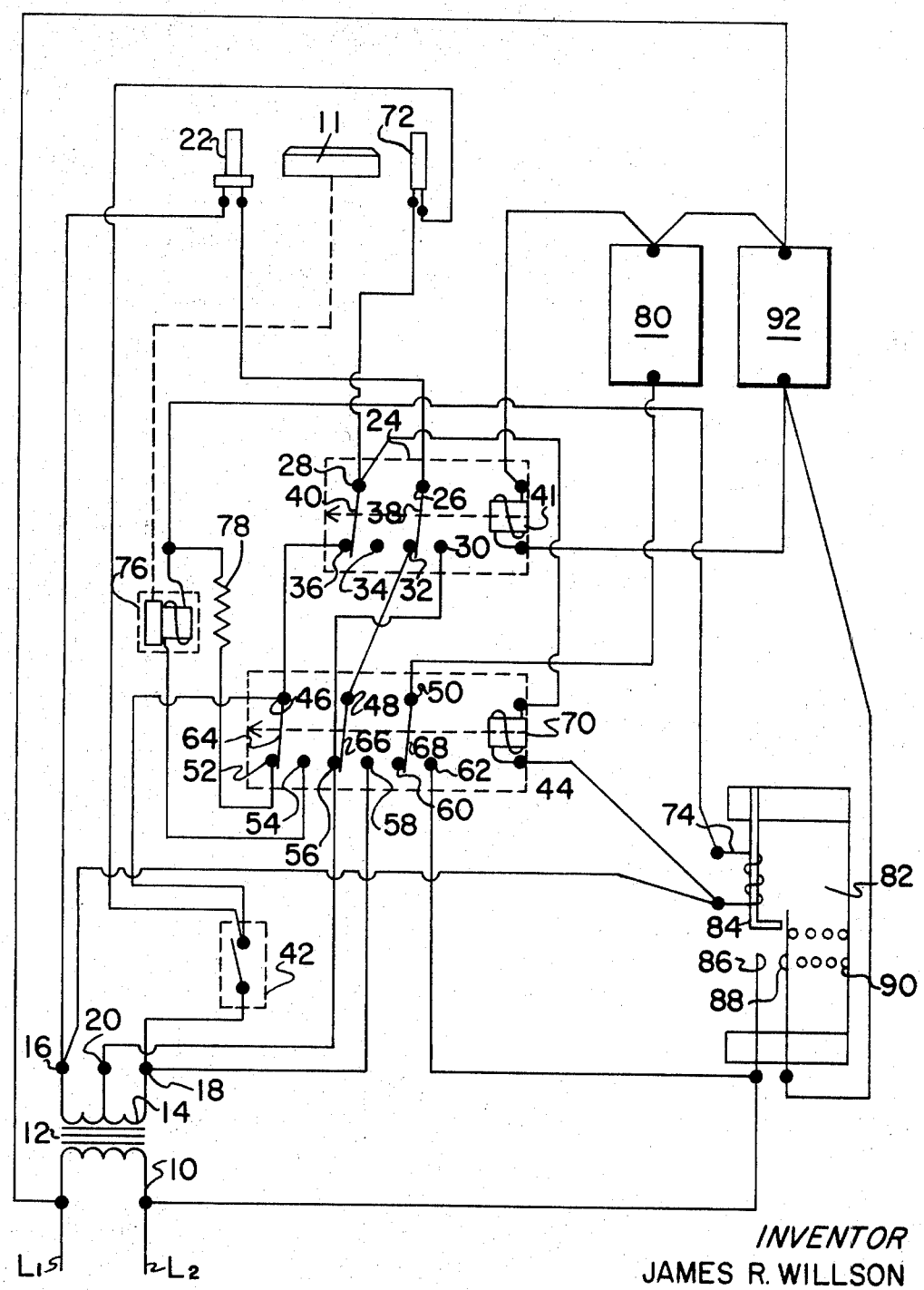
Figure 2:
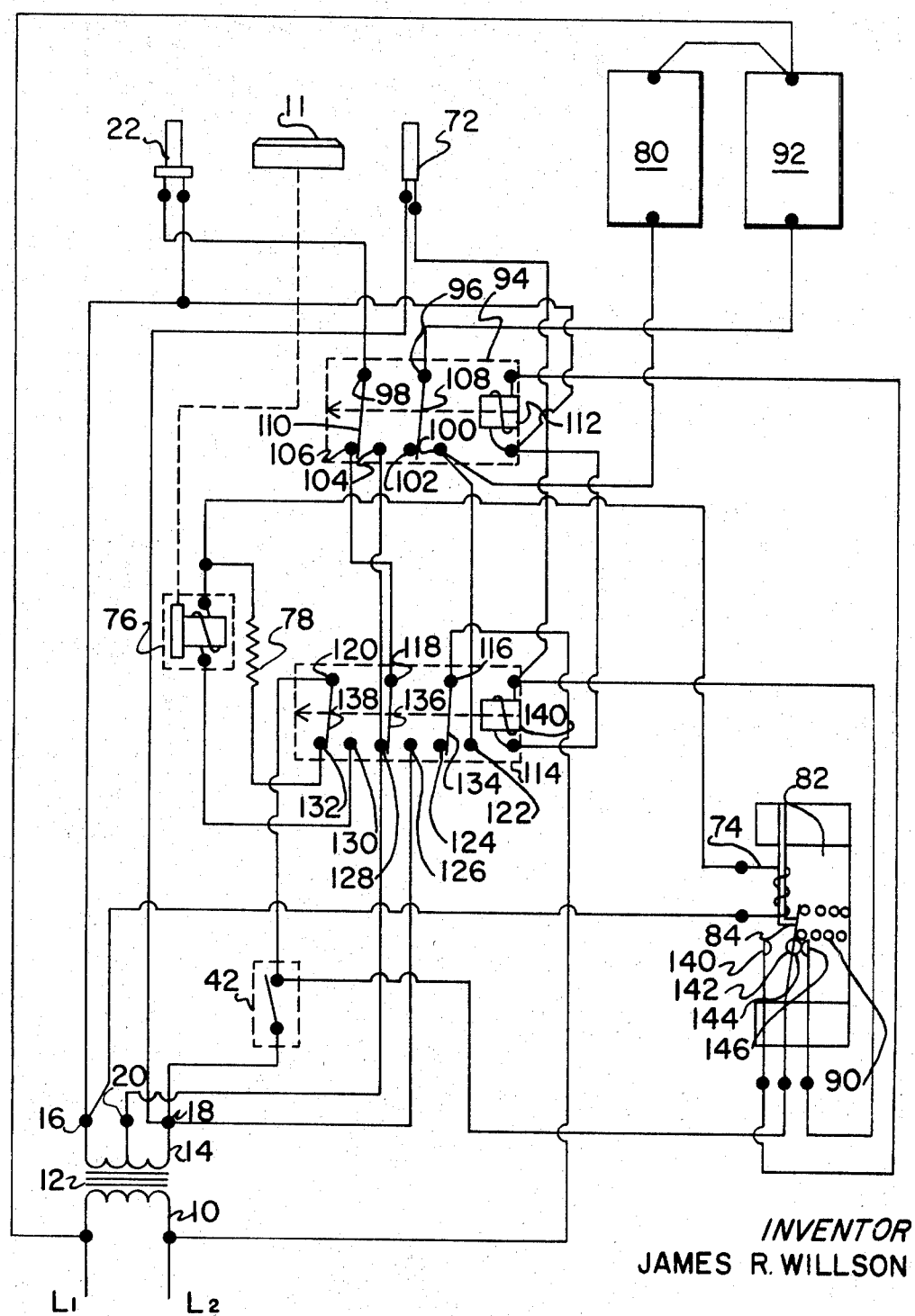

Other objects and advantages of the present invention will become apparent from the following description taken in connection with the accompanying drawing, wherein:

FIG. 1 is a schematic diagram of one embodiment of the present invention as utilized in a heating system;
FIG. 2 is a schematic diagram of a second embodiment of the present invention as used in a heating system; and
FIG. 3 is a schematic diagram of a third embodiment of the present invention as used in a heating system.

DESCRIPTION OF THE PREFERRED EMBODIMENTS

Figure 3:
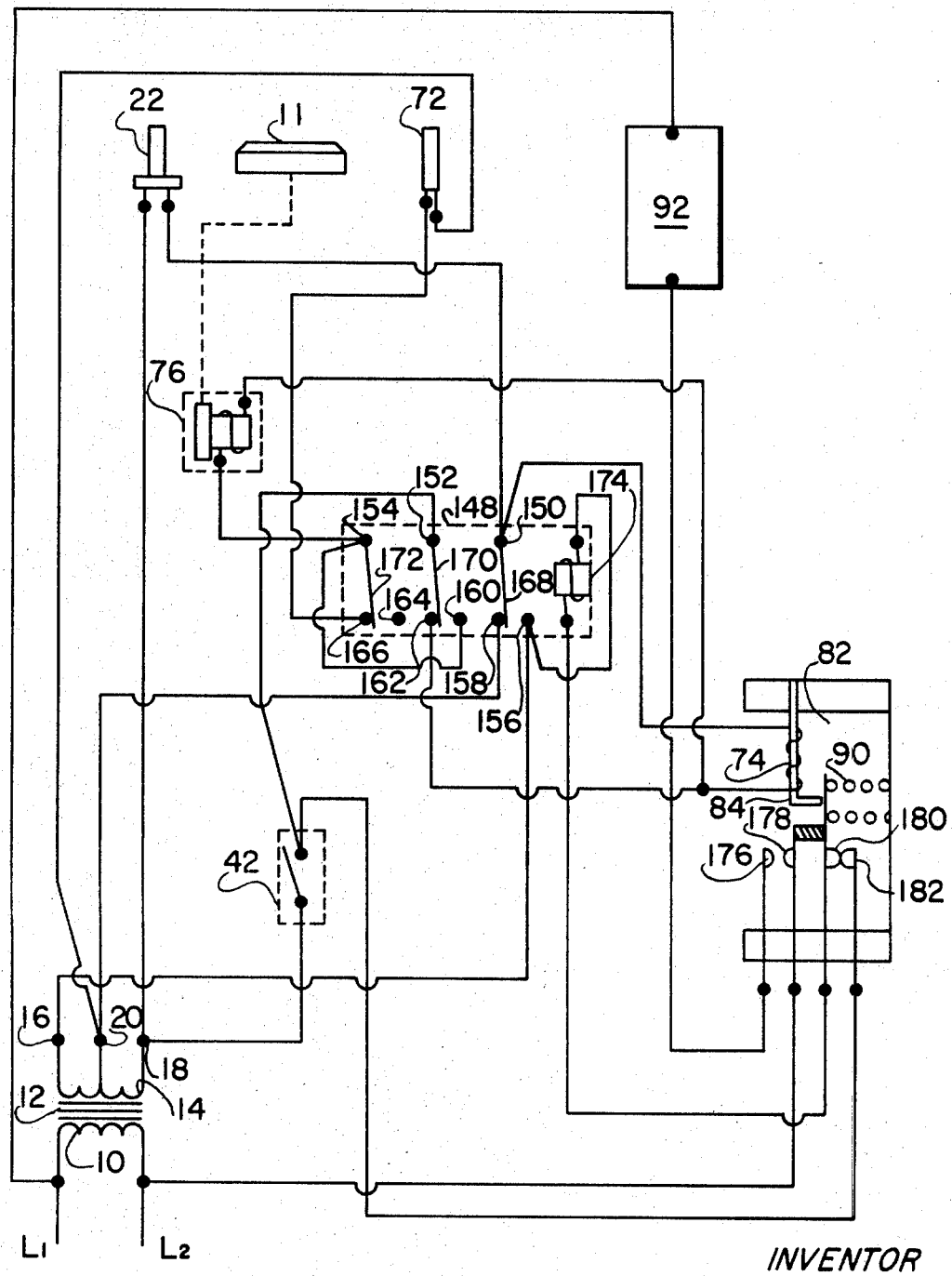

The use of the invention in a heating system, as shown in FIGS. 1, 2 and 3, is for exemplary purposes only, since the invention relates to temperature control systems in general, such as heating and/or cooling systems and is not meant to be limited to heating systems.

FIG. 1 illustrates a control circuit for a forced air heating system which employs two conventional relays and a single time delay relay. The forced air heating system includes an electric igniter 22, a main burner 11, a valve 76 for controlling a flow of fuel to burner 11, and an electric circulating fan 92 which forces air heated by burner 11 to the area to be temperature controlled. Power leads $L_1$ and $L_2$ are connected to a primary winding 10 of a step-down transformer 12. A secondary winding 14 of the transformer has two end terminals 16 and 18 and a center tapped terminal 20. Terminal 16 is connected through electric igniter 22 to a pole 26 in a relay 24. Relay 24 includes poles 26 and 28, contacts 30, 32, 34 and 36, blades 38 and 40, and coil 41. Terminal 18 is connected through an on-off temperature control thermostat 42 to a pole 46 of a relay 44. Relay 44 includes poles 46, 48 and 50, contacts 52, 54, 56, 58, 60 and 62, blades 64, 66 and 68, and a coil 70. When the relays 24 and 44 are deenergized, poles 26 and 28 are connected to contacts 32 and 36 by blades 38 and 40, respectively, and poles 46, 48 and 50 are connected to contacts 52, 56 and 60 by blades 64, 66 and 68, respectively. When the relays 24 and 44 are energized, poles 26 and 28 are connected to contacts 30 and 34 by blades 38 and 40, respectively, and poles 46, 48 and 50 are connected to contacts 54, 58 and 62 by blades 64, 66 and 68, respectively. Terminal 18 is also connected directly to contact 58 of relay 44 and through thermostat 42 and a flame sensing thermistor switch 72 to pole 28 of relay 24. Terminal 16 is also connected through a heating coil 74 and valve 76 to contact 54 of relay 44. Contact 52 of relay 44 is in circuit with a resistor 78 and heating coil 74; pole 46 of relay 44 is connected to contact 36 of relay 24; pole 48 of relay 44 is connected to contact 32 of relay 24; and pole 50 of relay 44 is connected to a combustion fan 80.

Heating coil 74 is part of a time delay relay 82 which includes a bimetal arm 84, a stationary contact 86, a movable contact 88 and an actuating spring 90. Contact 86 is connected to power lead $L_2$ and to contact 62 of relay 44. Contact 88 is connected to power lead $L_1$ through a circulation fan 92 and coil 41 in parallel relationship. The path between pole 28 and terminal 16 includes coil 70 of relay 44.

The heating coil 74 is wound around bimetal arm 84, and when there is current through coil 74, bimetal arm 84 is heated which causes it to deflect outward. The deflection of arm 84 allows spring 90 to force contact 88 out to close contacts 86 and 88. Similarly, when bimetal arm 84 cools, it will deflect inward compressing spring 90 and opening contacts 86 and 88.

Relays 24 and 44 are energized when sufficient current is conducted through their respective coils 41 and 70, to pull down the blades in each relay.

Electric igniter 22 has electrical energy applied to it at all times, except during an electrical interruption. When only half the secondary winding voltage is applied to it, electrical igniter 22 is in a standby condition and does not operate to ignite burner 11; however, when full secondary winding voltage is applied to it, electric igniter 22 will operate to ignite burner 11.

In the operation of the embodiment of FIG. 1, an off condition is defined when thermostat 42 is off in response to the temperature in the area to be temperature controlled. At this time, bimetal arm 84 maintains contacts 86 and 88 open thereby deenergizing relay 24. Relay 44 is also deenergized since there is no current through coil 70 due to the open circuit at thermostat 42. In the off condition, the only closed circuit is from terminal 16 through igniter 22, pole 26, contact 32, pole 48 and contact 56 to terminal 20 thereby applying half the secondary winding voltage to igniter 22 to place it in its standby condition, consequently, valve 76 is closed, combustion fan 80 is off and circulation fan 92 is off.

A heat demand condition is defined when thermostat 42 is on which permits current to flow from terminal 18 through thermostat 42, pole 46, contact 36, pole 28 and coil 70 to terminal 16. The current flow through coil 70 energizes relay 44 thereby closing the following circuits: (1) from power lead $L_2$ through contact 62, pole 50 and combustion fan 80 to power lead $L_1$ thereby starting the combustion fan; (2) from terminal 16 through igniter 22, pole 26, contact 32, pole 48 and contact 58 to terminal 18 thereby applying the full secondary winding voltage to igniter 22; and (3) from terminal 16 through heating coil 74, valve 76, contact 54, pole 46 and thermostat 42 to terminal 18 thereby opening valve 76 and permitting heater coil 74 to begin heating. Thus, in the heat demand condition, valve 76 is open, igniter 22 is fully energized, combustion fan 80 is on, circulation fan 92 is off, and heating coil 74 is starting to cause bimetal element 84 to deflect outward. At this time, if there is proper ignition, thermistor 72 senses a flame in the burner 11 and conducts.

After bimetal arm 84 is heated sufficiently to allow contacts 86 and 88 to close, a full heating condition is defined in which a current path will be completed from lead $L_2$ through contacts 86 and 88 and coil 41 to lead $L_1$ thereby energizing relay 24. When relay 24 is energized, the following circuits are closed: (1) from terminal 16 through igniter 22, pole 26, contact 30 and contact 56 to terminal 20 thereby applying half the secondary winding voltage to igniter 22 to place it in its standby condition; (2) from terminal 16 through heating coil 74, valve 76, contact 54, pole 46 and thermostat 42 to terminal 18 thereby maintaining valve 76 open and continuing to heat bimetal arm 84; (3) from terminal 16 through coil 70, pole 28, thermistor 72 and thermostat 42 to terminal 18 thereby energizing relay 44 as long as thermistor 72 is conducting; (4) from lead $L_2$ through contact 62, pole 50 and combustion fan 80 thereby maintaining combustion fan 80 on; and (5) from lead $L_2$ through contacts 86 and 88 and circulation fan 92 to lead $L_1$ thereby starting the circulation fan and delivering heat to the area to be temperature controlled. Thus, in the full heating condition, igniter 22 is in its standby condition, valve 76 is open, combustion fan 80 is on and circulation fan 92 is on.

If there is defective ignition, a lock-out condition is defined in which thermistor 72 is non-conductive due to the absence of a flame at burner 11, and relay 44 is deenergized. When this occurs, combustion fan 80 is turned off, valve 76 is closed due to the opening of contact 54, igniter 22 remains in its standby state and circulation fan 92 remains on. A closed circuit now exists from terminal 16 through heating coil 74, resistor 78, contact 52, pole 46 and thermostat 42 to terminal 18. This circuit keeps bimetal arm 84 heated which keeps contacts 86 and 88 closed, thereby preventing temperature response until the system is reset. The operation is such that if thermistor 72 is not conducting by the time contacts 86 and 88 are closed by time delay relay 82, there is no circuit to energize coil 70 and relay 44 is deenergized which places the system in its lock-out condition. If the circuit containing resistor 78 is removed, the system recycles instead of locking-out since there is no current for heating coil 74 and bimetal arm 84 cools thereby opening contacts 86 and 88 and deenergizing relay 24. Thus, to modify the control system from a lock-out system to a recycle system, requires only the removal of the connection provided by resistor 78.

In order to reset the system from its lock-out condition due to ignition failure, thermostat 42 is opened and the system reverts to the off condition after bimetal arm 84 cools.

Once full heating is achieved with proper ignition if there is an electrical interruption, both relays 24 and 44 are deenergized and the system is closed down until there is a resumption of power, at which time the system recycles. If there is a gas line interruption or any flame failure thermistor 72 is non-conducting which deenergizes relay 44 in the same manner as previously described with respect to ignition failure, and the system assumes its lock-out condition thereby requiring reset by opening thermostat 42. If the electrical interruption is momentary, relays 24 and 44 will not be deenergized due to their holding characteristics and the system will continue in its full heating condition upon resumption of electricity.

Once the heating demand is satisfied, thermostat 42 is turned off, which deenergizes relay 44 to close only the following circuits: (1) from lead $L_2$ through contacts 86 and 88 and coil 41 to lead $L_1$ thereby energizing relay 24; (2) from terminal 16 through igniter 22, pole 26, contact 30 and contact 56 to terminal 20 thereby maintaining igniter 22 in its standby condition; and (3) from lead $L_2$ through contacts 86 and 88 and circulation fan 92 to lead $L_1$ thereby maintaining circulation fan 92 in operation. When time delay relay 82 cools to the extent that contacts 86 and 88 are opened, relay 24 is deenergized, circulation fan 92 is turned off, and the system reverts to its off condition.

While the embodiment of FIG. 1 utilizes a single time delay relay, one conventional relay operating off the primary winding voltage and one conventional relay operating off the full secondary winding voltage, the embodiment of FIG. 2 utilizes two conventional relays, both of which operate off the full secondary winding voltage with a single time delay relay. The elements common to both FIG. 1 and FIG. 2 are given identical reference numerals and are not further described for the sake of brevity.

In FIG. 2, a conventional relay 94 includes poles 96 and 98, contacts 100, 102, 104 and 106, blades 108 and a 110 and coil 112. When relay 94 is deenergized, pole 96 is connected to contact 102 by blade 108 and pole 98 is connected to contact 106 by blade 110, and when relay 94 is energized, pole 96 is connected to contact 100 by blade 108 and pole 98 is connected to contact 104 by blade 110.

A conventional relay 114 includes poles 116, 118 and 120, contacts 122, 124, 126, 128, 130 and 132, blades 134, 136 and 138, and a coil 140. When relay 114 is deenergized, poles 116, 118 and 120 are connected to contacts 124, 128 and 132 by blades 134, 136 and 138, respectively and, when relay 114 is energized, poles 116, 118 and 120 are connected to contacts 122, 126 and 130 by blades 134, 136 and 138, respectively.

Time delay relay 82 includes a pair of normally open outer contacts 140 and 142 and a pair of normally closed inner contacts 144 and 146 along with heating coil 74, actuating spring 90 and bimetal arm 84.

In the operation of the embodiment of FIG. 2, an off condition is defined when thermostat 42 is off which deenergizes relays 94 and 114 and maintains inner contacts 144 and 146 of time delay relay 82 closed. The only closed circuit at this time is from terminal 16 through igniter 22, pole 98, contact 106, pole 118 and contact 128 to terminal 20 thereby maintaining igniter 22 in its standby condition. Thus, in the off condition, valve 76 is closed, combustion fan 80 is off, circulation fan 92 is off and igniter 22 is in its standby condition.

A heat demand condition is defined when thermostat 42 is turned on which closes a circuit from terminal 16 through coil 140, contacts 144 and 146 and thermostat 42 to terminal 18 thereby energizing relay 114. With relay 114 energized, the following circuits are closed: (1) from lead $L_2$ through pole 116, contact 122 and combustion fan 80 to lead $L_1$ thereby starting combustion fan 80; (2) from terminal 16 through igniter 22, pole 98, contact 106, pole 118 and contact 126 to terminal 18 thereby fully energizing igniter 22; and (3) from terminal 16 through heating coil 74, valve 76, contact 130, pole 120 and thermostat 42 to terminal 18 thereby opening valve 76 and energizing heating coil 74 to begin heating bimetal arm 84. Thus, in the heat demand condition, valve 76 is open, igniter 22 is fully energized, combustion fan 80 is on, circulation fan 92 is off and heating coil 74 is starting to heat bimetal arm 84.

If there is proper ignition, thermistor 72 conducts in response to the flame at burner 11 before contacts 144 and 146 open due to the outward deflection of bimetal arm 84. When contacts 144 and 146 open, and before contacts 140 and 142 close, the circuit from terminal 16 through coil 140 and thermistor 72 to terminal 18 acts to hold relay 114 in its energized state.

If there is an ignition failure, the system assumes a lock-out condition in which relay 114 is deenergized due to the non-conduction of thermistor 72 and the opening of contacts 144 and 146. When the system is in the lock-out condition the following circuits are closed: (1) from terminal 16 through igniter 22, pole 98, contact 106, pole 118 and contact 128 to terminal 20 thereby rendering igniter 22 in its standby condition; and (2) from terminal 16 through heating coil 74, resistor 78, contact 132, pole 120 and thermostat 42 to terminal 18 thereby continuing the heating of bimetal arm 84. When contacts 140 and 142 close in response to the heating of bimetal arm 84, relay 94 is energized; however, there is no change in the system's operation except for the path of the igniter standby current through relay 94. With the system in the lock-out condition, valve 76 is closed, combustion fan 80 is off and circulation fan 92 is off but heating coil 74 remains energized to provide and maintain the lock-out state. In order to reset the system, thermostat 42 is opened which deenergizes heating coil 74 and relay 94 thereby placing the system in the off condition.

When there is proper ignition after bimetal arm 84 deflects outward sufficiently to allow contacts 140 and 142 to close, a full heating condition is defined in which the following circuits are closed: (1) from terminal 16 through igniter 22, pole 98, contact 104 and contact 128 to terminal 20 thereby maintaining igniter 22 in its standby condition; (2) from terminal 16 through coil 112, contacts 140 and 142 and thermostat 42 to terminal 18 thereby energizing relay 94; (3) from terminal 16 through coil 140 and thermistor 72 to terminal 18 thereby energizing relay 114; (4) from terminal 16 through heating coil 74, valve 76, contact 130, pole 120 and thermostat 42 to terminal 18 thereby maintaining valve 76 open and continuing to heat bimetal arm 84; (5) from lead $L_2$ through pole 116, contact 100 and combustion fan 80 to lead $L_1$ thereby maintaining combustion fan 82 in operation; and (6) from lead $L_2$ through pole 116, contact 122, contact 100, pole 96 and circulation fan 92 to lead $L_1$ thereby maintaining circulation fan 92 in operation. Thus, in the full heating condition, valve 76 is open, igniter 22 is at standby, combustion fan 80 is on and circulation fan 92 is operating to deliver the heat from the burner to the area to be temperature controlled.

If there is an electrical interruption when the system is in the full heating condition, relays 94 and 114 are deenergized and the entire system is off. When power resumes, the system recycles; that is, if thermostat 42 is on, the system proceeds toward the full heating condition and if thermostat 42 is off, the system proceeds toward the off condition. If the electrical interruption is momentary, relay 114 will not be deenergized due to its holding characteristic and the system will continue in its full heating condition upon resumption of electricity.

If there is a gas interruption or a flame failure, thermistor 72 is rendered non-conducting thereby deenergizing relay 114 to place the system in its lock-out condition, which has the same closed circuits as the lock-out condition caused by ignition failure. That is, heating coil 74 continues to heat bimetal arm 84, igniter 22 is at standby, combustion fan 80 is off, circulation fan 92 is off, and valve 76 is closed. To reset the system, thermostat 42 is opened which causes the system to revert to the off condition.

Upon satisfaction of heat demand, thermostat 42 is turned off and the system is reset from the full heating condition to the off condition in which valve 76 is closed, heating coil 74 is not energized, combustion fan 80 is off, circulation fan 92 is off and igniter 22 is in its standby condition.

The removal of the circuit provided by resistor 78 prevents the system from having a lock-out condition because bimetal arm 84 cools and opens contacts 140 and 142. Hence, if recycling is desired, rather than lock-out, for ignition failure, gas failure or flame extinguishment, removal of resistor circuit 78 is all that is required.

While the embodiments of FIGS. 1 and 2 utilize two conventional relays in cooperation with a time delay relay, the embodiment of FIG. 3 utilizes only one conventional relay in cooperation with a time delay relay. The elements of FIG. 3 which are common to FIGS. 1 and 2 are given identical reference numerals and are not further described for the sake of brevity.

A conventional relay 148 includes poles 150, 152 and 154, contacts 156, 158, 160, 162, 164 and 166, blades 168, 170 and 172, and a coil 174. When relay 148 is deenergized, poles 150, 152 and 154 are connected to contacts 158, 162 and 166 by blades 168, 170 and 172, respectively, and when relay 148 is energized, poles 150, 152 and 154 are connected to contacts 156, 160 and 164 by blades 168, 170 and 172, respectively.

A time delay relay 82 includes a pair of normally open outer contacts 176, 178 and a pair of normally closed inner contacts 180, 182 along with an actuating spring 90, a bimetal arm 84 and a heating coil 74.

In the operation of the embodiment of FIG. 3, an off condition is defined when thermostat 42 is off, which permits only a single closed circuit from terminal 18 through igniter 22, pole 150 and contact 158 to terminal 20 thereby maintaining igniter 22 in its standby condition. Thus, in the off condition, valve 76 is closed, circulation fan 92 is off and igniter 22 is in its standby condition.

A heat demand condition is defined when thermostat 42 is on, which completes a circuit from terminal 18 through thermostat 42, contacts 182, 180, coil 174 and contact 156 to terminal 16 thereby energizing relay 148. When relay 148 is energized, the following circuits are closed: (1) from terminal 18 through thermostat 42, pole 152, contact 160, pole 154, valve 76, heating coil 74, pole 150 and contact 156 to terminal 16 thereby opening valve 76 and energizing heating coil 74 to begin heating bimetal arm 84; and (2) from terminal 18 through igniter 22, pole 150 and contact 156 to terminal 16 thereby fully energizing igniter 22. Thus, in the heat demand condition, valve 76 is open, igniter 22 is fully energized and circulation fan 92 remains off.

If there is proper ignition, thermistor 72 senses a flame at burner 11 before the deflection of bimetal arm 84 opens contacts 180 and 182 which deenergizes relay 148. With relay 148 deenergized and a flame sensed by thermistor 72, the following circuits are closed: (1) from terminal 18 through thermostat 42, pole 152, contact 162, valve 76, pole 154, contact 166 and thermistor 72 to terminal 20 thereby maintaining valve 76 open; (2) from terminal 18 through thermostat 42, pole 152, contact 162, heating coil 74, pole 150 and contact 158 to terminal 20 to thereby continue the heating of bimetal arm 84; and (3) from terminal 18 through igniter 22, pole 150 and contact 158 to terminal 20 thereby maintaining igniter 22 in its standby condition. When bimetal arm 84 has deflected sufficiently to close contacts 176 and 178, a circuit is completed from lead L₂ through contacts 178, 176 and circulation fan 92 to lead L₁ thereby energizing circulation fan 92. With proper ignition as described above, the system is in a full heating condition in which valve 76 is open, igniter 22 is in a standby condition and circulation fan 92 is energized.

If there is an ignition failure, the system will assume a lock-out condition in which thermistor 72 is non-conducting thereby closing valve 76. In the lock-out condition, the following circuits are closed: (1) from lead L₂ through contacts 178, 176 and circulation fan 92 to lead L₁ thereby maintaining circulation fan 92 on; (2) from terminal 18 through thermostat 42, pole 152, contact 162, heating coil 74, pole 150 and contact 158 to terminal 20 thereby continuing to heat bimetal arm 84 to keep contacts 176 and 178 closed; and (3) from terminal 18 through igniter 22, pole 150 and contact 158 to terminal 20 thereby maintaining igniter 22 in its standby condition. Thus, in the lock-out condition, valve 76 is closed, igniter 22 is in its standby condition and circulation fan 92 is in operation. The system will remain in this condition due to the closure of contacts 176 and 178 caused by the continuous energization of heating coil 74. To reset the system, thermostat 42 is opened which causes the system to reveret to the off condition.

If there is an electrical interruption when the system is in its full heating condition, valve 76 will close, igniter 22 will be off and circulation fan 92 will be off. If the electrical interruption is long enough to allow bimetal arm 84 to cool sufficiently to close contacts 180 and 182, the system will recycle when electricity is returned. If the duration of the electrical interruption is not long enough to allow contacts 180 and 182 to close, the system will assume the lock-out condition, as previously described with respect to ignition failure, and may be reset by opening thermostat 42. If the electrical interruption is only momentary, not allowing valve 76 to close, there will be no effect on the system and it will continue in the full heating condition.

If there is a gas interruption or a flame failure while the system is in its full heating condition, the system will be placed in the lock-out condition, as previously described with respect to ignition failure, due to thermistor 72 becoming non-conductive upon flame outage. The nonconduction of thermistor 72 opens the circuit including valve 76 to thereby close valve 76. To reset the system from the lock-out condition, thermostat 42 is opened.

Upon heating satisfaction, thermostat 42 is opened and the only remaining closed circuit is from terminal 18 through igniter 22, pole 150 and contact 158 to terminal 20 thereby maintaining igniter 22 in its standby condition. Circulation fan 92 continues in operation until contacts 176 and 178 open due to the cooling of bimetal arm 84. When bimetal arm 84 cools sufficiently to open contacts 176 and 178, the system reverts to its off condition and is ready for another cycle.

Inasmuch as the present invention is subject to many modifications, variations and changes in details, it is intended that all matter contained in the foregoing description or shown on the accompanying drawing shall be interpreted as illustrative and not in a limiting sense.

What is claimed is:

1. In a temperature control system of the type in which air is temperature controlled by operation of a burner and is circulated to control the temperature in an area, the combination comprising valve means adapted to control a flow of fuel to the burner;
an electric igniter adapted to ignite the fuel at the burner;
a circulation fan for circulating the temperature controlled air to control the temperature in the area;
a thermostatic switch for sensing the temperature in the area and having an on position and an off position;
an input circuit;
first relay means having a time delay and including first switch means controlled by first actuating means;
second relay means including second switch means controlled by second actuating means;
first connecting means including said first switch means for connecting said second actuating means with said input circuit;
second connecting means including said thermostatic switch for connecting said first actuating means with said input circuit;
third connecting means including said second switch means for connecting said electric ignitor with said input circuit to fully energize said electric ignitor for a time period equal to said time delay of said first relay means;
fourth connecting means including said thermostatic switch for connecting said valve means with said input circuit; and
fifth connecting means for connecting said circulation fan with said input circuit under the control of said first switch means to energize said circulation fan a period of time equal to said time delay of said first relay means after said thermostatic switch is moved to the on position.

2. The invention as recited in claim 1 wherein said first relay means includes third switch means controlled by said first actuating means, said first switch means being normally closed and said third switch means being normally open and said first switch means being open and said third switch means being closed when said first relay means is actuated, and said fifth connecting means includes said third switch means.

3. The invention as recited in claim 2 and further comprising flame sensing means conductive upon sensing a flame at the burner, and sixth connecting means including said flame sensing means for connecting said valve means with said input circuit to maintain said valve means open when a flame is sensed and to close said valve means if a flame is not sensed a time period equal to said time delay of said first relay means after said thermostatic switch is moved to the on position whereby the temperature control system will assume a lock-out condition in response to defective ignition or fuel failure.

4. The invention as recited in claim 3 wherein said electric igniter has a standby condition and a fully energized condition, and said second switch means included in said third connecting means includes means placing said electric igniter in the fully energized condition for a time period equal to said time delay of said first relay means after said thermostatic switch is moved to the on position and placing said electric igniter in the standby condition when said thermostatic switch is in the off condition and when a time period equal to said time delay of said first relay means has elapsed after said thermostatic switch has been moved to the on position.

5. The invention as recited in claim 1 wherein said second relay means includes third switch means controlled by third actuating means, and further comprising a sixth connecting means including said second switch means and said thermostatic switch for connecting said third actuating means with said input circuit, said fourth connecting means includes said third switch means, and said fifth connecting means includes said first switch means, said first switch means being normally open and being closed a time period equal to said time delay of said first relay means after said thermostatic switch is moved to the on position to energize said circulation fan.

6. The invention as recited in claim 5 and further comprising flame sensing means conductive upon sensing a flame at the burner, and seventh connecting means including said flame sensing means connecting said third actuating means with said input circuit to maintain said valve means open when a flame is sensed and to close said valve means if a flame is not sensed a time period equal to said time delay of said first relay means after said thermostatic switch is moved to the on position whereby the temperature control system will assume a lock-out condition in response to defective ignition or fuel failure.

7. The invention as recited in claim 6 wherein said electric igniter has a standby condition and a fully energized condition, and said third connecting means includes said third switch means to place said electric igniter in the fully energized condition for a time period equal to said time delay of said first relay means after said thermostatic switch is moved to the on position and to place said electric igniter in the standby condition when said thermostatic switch is in the off condition and when a time period equal to said time delay of said first relay means has elapsed after said thermostatic switch has been moved to the on position.

8. The invention as recited in claim 1 wherein said first relay means includes third switch means controlled by said first actuating means, said first switch means being normally open and said third switch means being normally closed and said first switch means being closed and said third switch means being open when said first relay means is actuated, said second relay means includes fourth switch means controlled by third actuating means, and further comprising sixth connecting means including said thermostatic switch and said third switch means for connecting said third actuating means with said input circuit, said fourth connecting means includes said fourth switch means, and said fifth connecting means includes said second switch means and said fourth switch means to energize said circulation fan a time period equal to said time delay of said first relay means after said thermostatic switch is moved to the on position.

9. The invention as recited in claim 8 and further comprising flame sensing means conductive upon sensing a flame at the burner, and seventh connecting means including said flame sensing means for connecting said third actuating means with said input circuit to maintain said valve means open when a flame is sensed and to close said valve means if a flame is not sensed a time period equal to said time delay of said first relay means after said thermostatic switch is moved to the on position whereby the temperature control system will assume a lock-out condition in response to defective ignition or fuel failure.

10. The invention as recited in claim 9 wherein said electric igniter has a standby condition and a fully energized condition, and said third connecting means includes said fourth switch means to place said electric igniter in the fully energized condition for a time period equal to said time delay of said first relay means after said thermostatic switch is moved to the on position and to place said electric igniter in the standby condition when said thermostatic switch is in the off condition and when a time period equal to said time delay of said first relay means has elapsed after said thermostatic switch has been moved to the on position.

References Cited
UNITED STATES PATENTS

| | | | |
|---|---|---|---|
| 2,160,592 | 5/1939 | King | 236—11 |
| 2,375,900 | 5/1945 | De Lancey | 236—11 |
| 2,599,101 | 6/1952 | Frerer. | |
| 3,092,095 | 6/1963 | Hottenroth et al. | 126—110 |

JAMES W. WESTHAVER, Primary Examiner

U.S. Cl. X.R.

236—11; 431—78